United States Patent
Kim et al.

(10) Patent No.: US 7,848,351 B2
(45) Date of Patent: Dec. 7, 2010

(54) METHOD FOR SHARING CONTENTS BETWEEN DEVICES USING IEEE 1394 INTERFACE IN DLNA SYSTEM

(75) Inventors: Chul-Seung Kim, Seoul (KR); Yun-Je Oh, Yongin-si (KR); Joon-Oo Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 453 days.

(21) Appl. No.: 11/642,104

(22) Filed: Dec. 20, 2006

(65) Prior Publication Data

US 2007/0211728 A1 Sep. 13, 2007

(30) Foreign Application Priority Data

Mar. 9, 2006 (KR) .................. 10-2006-0022228

(51) Int. Cl.
*H04J 3/16* (2006.01)
*H04L 12/28* (2006.01)
(52) U.S. Cl. .................... 370/466; 370/395.5
(58) Field of Classification Search .......... None
See application file for complete search history.

(56) References Cited

U.S. PATENT DOCUMENTS

2004/0246992 A1* 12/2004 Henry et al. ............... 370/467
2005/0210119 A1* 9/2005 Kumar ...................... 709/217
2006/0143288 A1* 6/2006 Sato et al. .................. 709/223
2006/0164550 A1* 7/2006 Yoshimoto et al. ......... 348/571

* cited by examiner

*Primary Examiner*—Salman Ahmed
*Assistant Examiner*—Sori A Aga
(74) *Attorney, Agent, or Firm*—Cha & Reiter, LLC

(57) ABSTRACT

Provided is a method for sharing contents between devices using an IEEE 1394 interface in a DLNA system. The method includes transporting a SetAVTransportURI from a DMP to a DMS, and informing the DMS of a URI of a content; upon receipt of the SetAVTransportURI, performing the steps of transporting a "CONNECT" command to the DMP using a protocol, and preparing contents transport between the DMP and the DMS; upon preparation of the contents transport, performing the steps of transporting a command depending on each environment between the DMP and the DMS, controlling contents transport in the IEEE 1394 interface, and linking the contents transport between the DMP and the DMS; and upon ending of the contents control and transport, performing the steps of transporting a "DISCONNECT" command between the DMP and the DMS using the protocol, performing a cleanup between the DMP and the DMS, and ending the contents transport.

10 Claims, 4 Drawing Sheets

METHOD FOR SHARING CONTENTS BETWEEN DEVICES USING IEEE 1394 INTERFACE IN DLNA SYSTEM

CLAIM OF PRIORITY

This application claims priority under 35 U.S.C. §119 to an application entitled "Method for Sharing Contents between Devices Using IEEE 1394 Interface in DLNA System." filed in the Korean Intellectual Property Office on Mar. 9, 2006 and assigned Serial No. 2006-22228, the entire contents of which are incorporated herein by reference.

BACKGROUND OF THE INVENTION

1. Field of the Invention

The present invention relates generally to a digital living network alliance (DLNA) system, and in particular, to a method for sharing contents between devices using an Institute of Electrical and Electronics Engineers (IEEE) 1394 interface in a DLNA system.

2. Description of the Related Art

Home network technology provides a future-oriented home environment in which all information home appliance devices are connected by a wire/wireless network, and provide anyone with a variety of high quality home services without restriction as to device type, time, and place. The home network is regarded as a starting point and the most important component of a ubiquitous environment and associated technology is being continuously researched.

A standard organization for the home network technology is the Digital Living Network Alliance (DLNA). The DLNA is a succeeding standard organization of the existing Digital Home Working Group (DHWG). In June 2003, the DLNA was established by MS, IBM, HP, Intel, SONY of Japan, Samsung Electronics of Korea, etc., to address compatibility problems that are obstacles to common use of a home network. The DLNA consists of five committees: Technical Committee, Ecosystem Committee, Legal Committee, Interoperability & Compliance Committee, and Marketing PR Committee, and in addition, consists of six sub committees.

The DLNA defines a network coexisting in a home as a personal computer (PC) Internet network (PC, printer, facsimile, etc.), a mobile network (PDA, mobile phone, notebook computer, etc.), and a home appliance network (television, audio, DVD player, etc.). The DLNA attempts to provide interoperability of these networks using three methods of cooperation between main industries, a standardization of a mutual operability framework, and a product observing them.

Specifically, a technology considered by the DLNA is to allow a consumer to obtain many digital multimedia contents (photograph, music, video, etc.) from personal devices like a mobile device or a personal computer, and transport and manage the obtained contents. In other words, the technology allows a consumer to conveniently enjoy the digital multimedia contents irrespective of the consumer's location and a device's location within a home.

For this, the DLNA is proceeding with standardization of a physical media, a network transmission, a media format, a streaming protocol, a digital rights management (DRM), etc. on the basis of a Universal Plug and Play (UPnP).

The DLNA is now described in more detail. In the DLNA, networking is based on Internet protocol (IP). The IP is a basic network communication protocol of a device operating on the Internet that allows information of an application program operating in various media to be exchanged in a transparent manner.

For example, the PC or a set-top box (STB) can transport the digital multimedia contents to a home television by wireless, using an IEEE 802.11 access point (AP) connected to an Ethernet cable. As such, all DLNA devices can communicate with other devices connected to the Internet, using the IP, anywhere in the whole world.

A physical layer of the DLNA employs a wire high speed Ethernet (IEEE 802.11u) and a wireless Ethernet (IEEE 802.11a/b/g). The wire Ethernet has already demonstrated stability, and the wireless Ethernet has adopted a wireless-fidelity (Wi-Fi) as wireless home network communication increases.

A technique for detecting and controlling a device within a DLNA network is to automatically configure networking settings such as an IP address, and recognize and manage other devices on the network, and is based on existing UPnP AV architecture and UPnP device architecture. A technique for detecting and controlling a service within the DLNA network is also available.

In the DLNA, a device class is based on a digital media server (DMS) and a digital media player (DMP). The DMS performs a function of a media server device (MSD). That is, it performs a function of a server providing a media in a UPnP specification. The DMP performs functions of a media renderer device (MRD) and a media renderer control point (MRCP). That is, it performs functions of selecting and controlling a media, and playing the selected media.

FIG. 1 illustrates a construction of a conventional DLNA system.

As shown in FIG. 1, the DLNA system includes a digital media server (DMS) 110 for providing media contents 100, such as broadcasting A/V (audio/video) 101, comprising an application 102, and an SI (service information) information 103; and a digital media player (DMP) 130 for executing the media contents 100. In general, the DMP 103 comprises an integration of a plurality of wire/wireless DMPs. The DLNA system includes a network connection function (NCF) 120 as a middle node for connecting the DMP 130 with the DMS 110.

An existing communication protocol for connecting the DMP 130 with the NCF 120 includes Bluetooth and a wireless local area network (WLAN). The communication protocol may include and use ZigBee and a personal area network (PAN) that are typical technologies of a wireless sensor network characterized by lower power, lower cost, and ease of use in comparison to Bluetooth according to the planned future development of wireless network technology. In ZigBee, upper protocol layers and application are regularized on the basis of a PHY/MAC layer standardized in a 2003 IEEE 802.15.4 working group committee. The PAN is a personal local communication network defined on the basis of a human life style.

In the DLNA system, generally, the DMS 110 informs DLNA-compatible devices that the DMS 110 itself is a DMS. The DMP 130 having a rendering function accesses the DMS 110 and browses a contents (item) list of the DMS 110. The DMP 130 renders the contents using the contents (item) list received from the DMS 110.

In rendering the contents, a connection between the DMP 130 and the DMS 110 is generated, and the contents are transported to and rendered in the DMP 130 using hyper text transfer protocol (HTTP)-GET and real-time streaming protocol (RTSP) methods and the like. A method for transporting the contents from the DMS 110 to the DMP 130 is now described with reference to FIG. 2.

FIG. 2 is a ladder diagram illustrating a conventional method for receiving the contents in the DLNA system.

Using "SetAVTransport URI action" (Step 201) the DMP 130 transports to the DMS 110 a uniform resource identifier (URI) of the contents to be rendered, such as http://hostname/video-content/test.mpg,
rtsp://hostname/video-content/birthdayparty.m2v.

Using the received URI (Step 202), the DMS 110 generates an AV transfer connection between the DMP 130 and the DMS 110.

When the AV transfer connection is generated between the DMP 130 and the DMS 110, the DMP 130 transmits a "HTTP-GET" message requesting the transport to the DMS 110 (Step 203) of the A/V content of the URI.

The DMS 110 then provides the A/V contents to the DMP 130 (Step 204).

Using the above method, the DMP 130 can receive the contents from the DMS 110.

However, currently there is provided only HTTP-GET and RTP/RTSP that are protocols for contents transport defined in a UPnP AV stack. A protocol for contents transported in an IEEE 1.394 interface, that an AV home appliance device uses a majority of the time, currently has not been defined.

Accordingly, the DLNA has a goal of sharing contents without restricting such sharing to a device, a vendor, an operating system, etc., but has a drawback that it is impossible to share the contents since the DLNA protocol for the contents transport is not defined for the device using the IEEE 1394 interface.

SUMMARY OF THE INVENTION

Therefore, the present invention provides a method for sharing contents between devices using an IEEE 1394 interface in a DLNA system, the method for providing a device, which supports a DLNA and uses the IEEE 1394 interface in the DLNA system, with a SetAVTransport protocol for contents sharing, thereby making it possible to share the contents between the devices using the IEEE 1394 interface. Further, after a setAVTransport connection, the method of the present invention defines the protocol for transport of contents between a DMP and a DMS, thereby subsequently making possible a linkage using the contents.

In the present invention, there is provided a method for sharing contents between devices using an IEEE 1394 interface in a DLNA system. The method comprises the steps of transporting a SetAVTransportURI from a DMP to a DMS, and informing the DMS of a URI (uniform resource identifier) of a content to be transported; upon receipt of the SetAVTransportURI by the DMS, performing the steps of transporting a "CONNECT" command to the DMP using a protocol, and preparing contents transport between the DMP and the DMS; upon preparation of the contents transport between the DMP and the DMS, performing the steps of transporting a command depending on each environment between the DMP and the DMS, controlling contents transport in the IEEE 1394 interface, and linking the contents transport between the DMP and the DMS; and upon ending of the contents transport and control between the DMP and the DMS, performing the steps of transporting a "DISCONNECT" command between the DMP and the DMS using the protocol, performing a cleanup between the DMP and the DMS, and ending the contents transport.

BRIEF DESCRIPTION OF THE DRAWINGS

The above and other features and advantages of the present invention will become more apparent from the following detailed description when taken in conjunction with the accompanying drawings in which.

DETAILED DESCRIPTION

Figure 1:
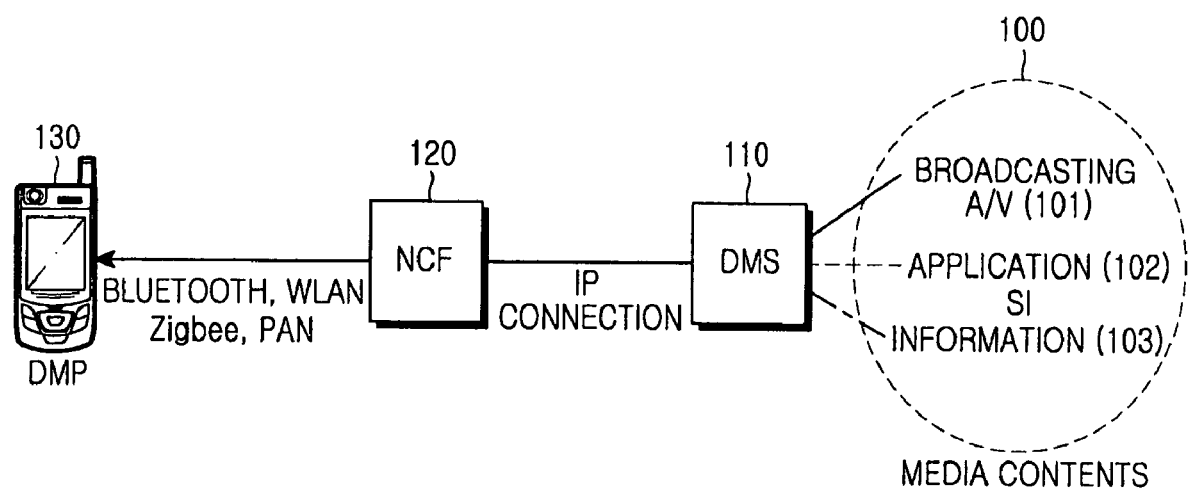
FIG. 1 illustrates a construction of a conventional DLNA system.
Figure 2:
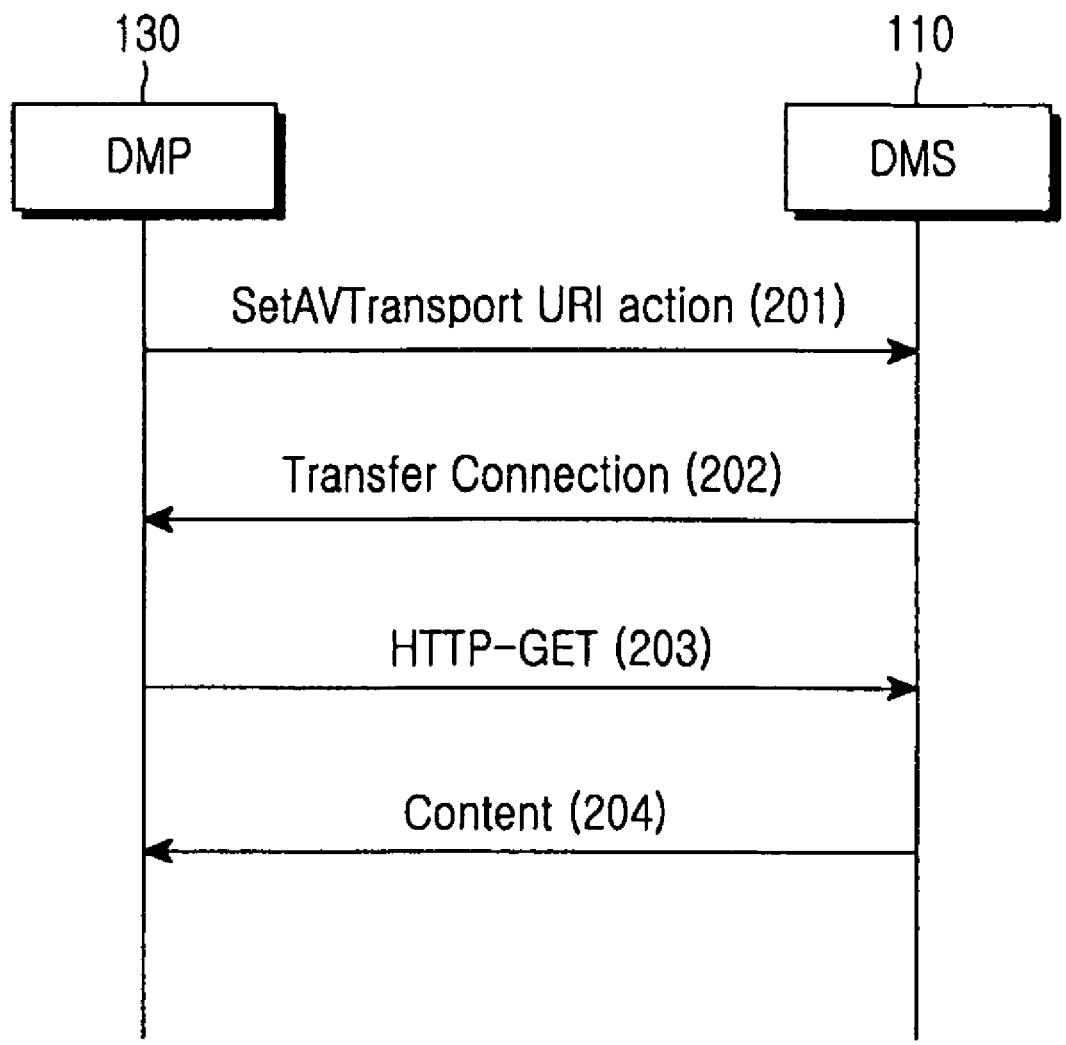
FIG. 2 illustrates a ladder diagram of a conventional method for receiving contents in a DLNA system.

An embodiment of the present invention is now described in detail with reference to the annexed drawings. In the drawings, the same or similar elements are denoted by the same reference numerals even though they are depicted in different drawings. For the purposes of clarity and simplicity, a detailed description of known functions and configurations incorporated herein has been omitted for conciseness.

The present invention relates to a SetAVTransport protocol for contents sharing between devices using an IEEE 1394 interface in a DLNA system. The present invention provides a method for, after establishment of a SetAVTransport connection, defining a protocol for transporting contents between a DMP and a DMS, thereby making a linkage using the contents possible.

In an exemplary embodiment of the present invention, a DLNA device (for example, the DMS and the DMP) has an Internet protocol (IP) connectivity, and includes a hyper text transfer protocol (HTTP) server/client. Thus, the DLNA device can receive and transmit Universal. Plug and Play (UPnP) messages. The DLNA device has one UPnP device or control point (CP) module. The DLNA device needs to support a DLNA/UPnP compatibility and the IEEE 1394 interface, and needs to support an IPover1394 technology, thereby making a transmission control protocol/Internet protocol (TCP/IP) possible. The IEEE 1394 interface and the IPover1394 technology are well known and thus, their detailed descriptions will be omitted. At the time of invention, the versions of the various protocols included the DMR functioning in accordance with MediaRenderer:1 Device Tem late Version 1.01 for UPnP 1.0; the DMC and the UPnP device functioning in accordance with a Device Control Protocol (DCP) according to AV Architecture 0.83 for UPnP version 1.0; and the IEEE 1394 interface functions in accordance with Audio Video/Command (AV/C) specification enhancement version 3.0 version 1.1, and (AV/C) specification version 4.1 and AV/C DISC Subunit specification 1.2.

In an exemplary embodiment of the present invention, a software (S/W) stack of each device employs an IP-based HTTP Multicast over UDP (HTTPMU) directory, an HTTP over UDP (HTTPU) directory, and hyper text transfer protocol (HTTP) stacks. The S/W stack includes a protocol stack defined by a UPnP device architecture, a protocol stack defined by a UPnP forum working committee, and a protocol stack defined by a UPnP vendor.

According to an exemplary embodiment of the present invention, in order to share the contents between the devices supporting a DLNA and using the IEEE 1394 interface in the DLNA system, the following uniform resource identifier (URI) for the IEEE 1394 system is provided.

Table 1 shows the URI provided by the present invention for the IEEE 1394 system.

TABLE 1 definition
  iec61883_URL = ( " iec61883:")
  "//" host [ ":" channel ] [ abs_path ]
  host = GUID
  port = *DIGIT
Example
  iec61883://GUID:CHANNEL_NUMBER/test.mpg
  iec61883://0000f00200001114:63/test.mpg The URI provided for the IEEE 1394 system includes protocol name information, IEEE 1394 interface host information, and a channel number to transport the contents.

Referring to Table 1, a protocol name is "iec61883", and a uniform resource locator (URL) is "GUID" denoting an IEEE 1394 interface host, and a "CHANNEL_NUMBER" to transport the contents.

For example, "iec61883://0000f00200001114:63/test.mpg" represents that using the IEEE 1394 interface "test.mpg" is transported over a channel number 63 in a device where the GUID is "0000f0200001114".

The DMP 130 and the DMS 110 mutually prepare an IEEE 1394 interface connection using the URI. The preparation is performed using an IEEE 1394 protocol. For example, in the case of contents transport using real-time transport protocol (RTP)/real-time streaming protocol (RTSP) URI, the DMP 130 and the DMS 110 transmit and receive a message therebetween using the RTSP protocol, thereby preparing the IEEE 1394 interface connection for the contents transport.

Table 2 shows a definition of a protocol for enabling the DMP 130 and the DMS 110 to mutually prepare the IEEE 1394 interface connection according to an exemplary embodiment of the present invention.

TABLE 2

= SetAVTransportURI
 - Player->Server
   CONNECT iec61883://0000f00200001114:63/test.mpg IEC61883/1.0
   GUID: 0000f00200001114
   VIDEO_TYPE: MPEG2_TS
   CHANNEL: 63;PCR: 0
   SPEED: 100
 - Server->Player
   IEC61883/1.0 OK
   Date: 23 Jan 1997 15:35:06 GMT
   GUID: 0000f00200001114
   CHANNEL: 63;PCR: 0
= Cleanup
 - Player->Server
   DISCONNECT iec61883://0000f00200001114:63/
   test.mpg IEC61883/1.0
   GUID: 0000f00200001114
CHANNEL: 63;PCR: 0
 - Server->Player
   IEC61883/1.0 200 OK
   GUID: 0000f00200001114
   CHANNEL: 63;PCR: 0
= Transport Control (play, stop, pause)
 - Player->Server
   PLAY iec61883://0000f00200001114:63/test.mpg IEC61883/1.0
   GUID: 0000f00200001114
   CHANNEL: 63;PCR: 0
 - Server->Player
   IEC61883/1.0 200 OK
   GUID: 0000f00200001114
   CHANNEL: 63;PCR: 0

When the DMS 110 receives a SetAVTransportURI from the DMP 130, the DMP 130 and the DMS 110 mutually prepare the IEEE 1394 interface connection using the protocol of Table 2.

As illustrated in Table 1, "iec61883://0000f00200001114:63/test.mpg" of Table 2 represents that using the IEEE 1394 interface "test.mpg" is transmitted over channel number 63 in a device where the GUID is "0000f00200001114". A "CONNECT" command is transported using an IEC61883/1.0.

Information that is transported together includes the GUID, a contents type, the channel number, a PCR number, and a SPEED value. As illustrated in Table 2, the GUID is "0000f00200001114", the contents type is "MPEG2_TS", the channel number is "63", the PCR number is "0", and the SPEED value is "100".

Subsequently, when the contents transport between the DMB 110 and the DMP 130 has been completed, the connection therebetween is ended using a "DISCONNECT" command. When other commands ("PLAY", "STOP", and "PAUSE") in the course of transport are required (for transport control), the appropriate command is transported therebetween.

If the DMP 130 and the DMS 110 support an IEEE 1394 AVC protocol, protocol transport between two devices (DMP 130 and DMS 110) is performed by the AVC protocol. Similarly, the "CONNECT", "DISCONNECT", "PLAY", "STOP", and "PAUSE" commands are also used.

Figure 3:
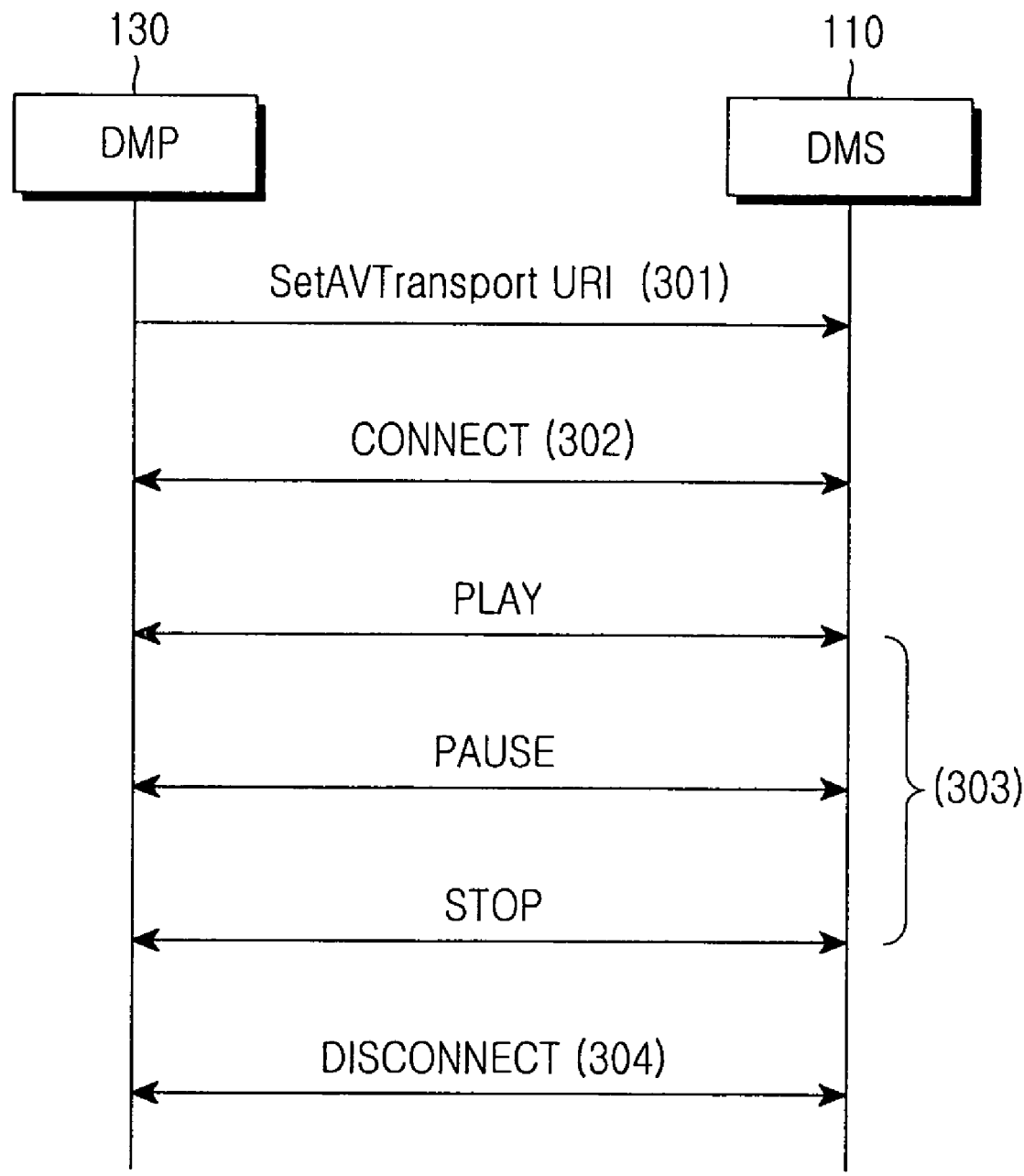
FIG. 3 illustrates a ladder diagram of a method for sharing contents between devices using an IEEE 1394 interface in a DLNA system according to an exemplary embodiment of the present invention.

FIG. 3 is a ladder diagram illustrating a method for sharing the contents between the devices using the IEEE 1394 interface in the DLNA system, according to an exemplary embodiment of the present invention.

In FIG. 3, the DMS 110 and the DMP 130 are in a state in which browsing of the contents has ended in a DLNA network.

In order to share the contents between the devices supporting the DLNA and using the IEEE 1394 interface in the DLNA system, the DMP 130 transports the SetAVTransportURI to the DMS 110, and informs the DMS 110 of the URI of the contents to be transported (Step 301). The URI transported from the DMP 130 to the DMS 110 includes the protocol name information, the IEEE 1394 interface host information, and the channel information.

If the DMS 110 does not support an AVTransport service, the DMS 110 does not transport the SetAVTransportURI.

When the DMS 110 does support an AVTransport service, upon the receipt of the SetAVTransportURI, the DMS 110 transports the "CONNECT" command to the DMP 130 using the protocol shown in Table 2, thereby preparing for transporting the contents between the DMP 130 and the DMS 110 (Step 302).

When the contents transport between the DMP 130 and the DMS 110 is prepared, the DMP 130 and the DMS 110 transport the "PLAY", "STOP", and "PAUSE" commands of the contents according to each environment, control contents transport in the IEEE 1394 interface, and make possible a linkage in the contents transport between the DMS 110 and the DMP 130 (Step 303).

When the contents transport and control between the DMP 130 and the DMS 110 has ended, the "DISCONNECT" command is transported using the protocol of Table 2 between the DMP 130 and the DMS 110, thereby cleaning-up between the DMP 130 and the DMS 110 and ending the contents transport (Step 304).

This process can make it possible to share the contents between the devices (DMS 110 and 130) supporting the DLNA and using the IEEE 1394 interface, and make possible the linkage using the protocol contents transported between the DMP 130 and the DMS 110.

Figure 4:
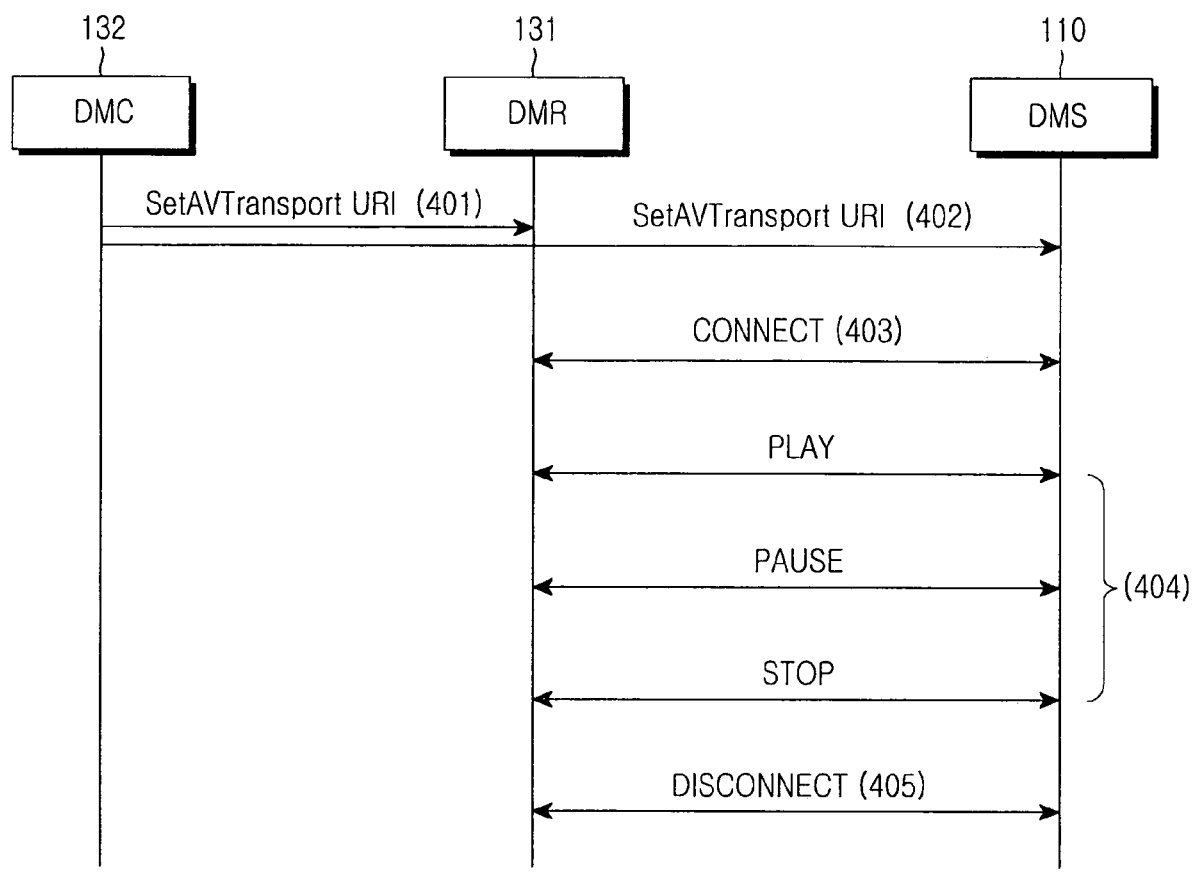
FIG. 4 illustrates a ladder diagram of a method for sharing contents between devices using an IEEE 1394 interface in a DLNA system according to another exemplary embodiment of the present invention.

FIG. 4 is a ladder diagram illustrating a method for sharing contents between devices using an IEEE 1394 interface in a DLNA system according to another exemplary embodiment of the present invention.

As shown in FIG. 4, it is exemplified that the DMP 130 of FIG. 3 is divided into a DMR 131 and a DMC 132, and is linked with a DMS 110. The DMC 132 enables an UPnP CP and has a media renderer control point and a media server control point modules thereby controlling the DMS 110 and the DMR 131. The DMR 131 has an UPnP device module and a HTTP client thereby rendering a media.

As in FIG. 3, the DMS 110, and the DMR 131 and the DMC 132 of FIG. 4 are in a state in which browsing of the contents has ended in the DLNA network.

In order to share the contents between the devices supporting the DLNA and using the IEEE 1394 interface in the DLNA system, the DMC 132 transports a SetAVTransportURI to the DMR 131 (Step 401). Upon receipt of the SetAVTransportURI from the DMC 132, the DMR 131 transports the received SetAVTransportURI to the DMS 110 and informs the DMS 110 of a URI of the contents to be transported (Step 402). The URI transported from the DMP 130 to the DMS 110 includes a protocol name information, an IEEE 1394 interface host information, and a channel information.

If the DMS 110 does not support an AVTransport service, the DMS 110 does not transport the SetAVTransportURI.

When the DMS 110 does support an AVTransport, the DMR 131 and the DMS 110 perform a linkage according to the protocol of Table 2 by the "CONNECT" command, thereby preparing the contents transport (Step 403).

The DMR 131 and the DMS 110 transport the "PLAY", "STOP", and "PAUSE" commands of the contents according to each environment, control contents transport in the IEEE 1394 interface, and make possible the linkage in the contents transport between the DMS 110 and the DMP 130 (Step 404).

When the contents transport and control between the DMR 131 and the DMS 110 has ended, cleanup is performed using the "DISCONNECT" and the contents transport is ended (Step 405).

Even in case where the DMP 130 is divided into the DMR 131 and the DMC 132 and is linked with the DMS 110, as above, the transport is similar except only that the DMP 130 is divided into the DMC 132 having a control function and the DMR 132 having a rendering function.

As described above, the present invention provides a device supporting the DLNA and using the IEEE 1394 interface in the DLNA system with the SetAVTransport protocol for contents to be shared, thereby making it possible to share the contents between the devices using the IEEE 1394 interface.

Further, the present invention defines the IEEE 1394 protocol for contents transport between the DMP and the DMS, thereby making possible the linkage using the contents.

The method of the present invention can be programmed and stored in a computer readable recording medium (CDROM, RAM, floppy disk, hard disk, and optical magnetic disk).

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for sharing contents in an environment between devices using an Institute of Electrical and Electronics Engineers (IEEE) 1394 interface in a Digital Living Network Alliance (DLNA) system, the method comprising the steps of:
   transporting a SetAVTransportURI from a digital media player (DMP) to a digital media server (DMS);
   informing the DMS of a uniform resource identifier (URI) of a content to be transported;
   upon receipt of the SetAVTransportURI by the DMS initiating a connection between the DMP and the DMS using a predefined IEEE 1394 contents transfer protocol;
   upon completion of connection initiation, controlling a transport of a contents between the DMP and the DMS in accordance with the predefined IEEE 1394 contents transfer protocol; and
   upon completion of contents control and transport between the DMP and the DMS, terminating the contents transport in accordance with the predefined IEEE 1394 contents transfer protocol;
   wherein the DMP includes a digital media renderer (DMR) and a digital media controller (DMC), wherein the DMR has a UPnP device module and a HTTP client rendering a media, and the DMC enables a UPnP control point (CP) and has a media renderer CP module and a media server control point modules to control the DMS and DMR so that the DMS and the DMR of the DLNA system transport data according to each environment and control contents transport in the IEEE 1394 interface to provide a linkage therebetween.

2. The method of claim 1, wherein the URI comprises its protocol name information, IEEE 1394 interface host information, and information on a channel number to transport the content.

3. The method of claim 1, wherein:
   the step of initiating a connection further comprises the steps of upon receipt of the SetAVTransportURI by the DMS performing the steps of—
   a. transporting a "CONNECT" command to the DMP using a protocol, and
   b. preparing for contents transport between the DMP and the DMS;
   the step of controlling further comprises the steps of upon completion of preparation for the contents transport between the DMP and the DMS, performing the steps of—
   c. in accordance with the environment, transporting a command between the DMP and the DMS,
   d. controlling contents transport in the IEEE 1394 interface, and linking the contents transport between the DMP and the DMS; and
   the step of terminating further comprises the steps of upon ending of the contents transport and control between the DMP and the DMS, performing the steps of—
   e. using the protocol, transporting a "DISCONNECT" command between the DMP and the DMS,
   f. performing a cleanup between the DMP and the DMS, and
   g. ending the contents transport.

4. The method of claim 3, wherein the URI comprises a protocol name information, an IEEE 1394 interface host information, and a channel number to transport the content.

5. The method of claim 3, wherein, in the step of transporting the "CONNECT" command to the DMP, the "CONNECT" command is transported using an international electrotechnical commission (IEC) 61883/1.0 protocol.

6. The method of claim 5, wherein, in the step of transporting the "CONNECT" command to the DMP, the "CONNECT" command is transported together comprising a GUID, a contents type, a channel number, a PCR number, and a SPEED value.

7. The method of claim 3, wherein, in the step of transporting the "CONNECT" command to the DMP, the contents transport between the DMP and the DMS is performed using an IEEE 1394 audio visual control (AVC) protocol when the DMP and the DMS support the IEEE 1394 AVC protocol.

8. The method of claim 3, wherein the command depending on each environment comprises "PLAY", "STOP", and "PAUSE" commands for controlling the contents transport in the IEEE 1394 interface in course of the contents transport between the DMP and the DMS.

9. The method of claim 1, wherein the DMP and the DMS support a DLNA/Universal Plug and Play (UPnP) compatibility and the IEEE 1394 interface, support an IPover1394 technology, and enable a transmission control protocol/Internet protocol (TCP/IP).

10. The method of claim 9, wherein S/W (software) stacks of the DMP and the DMS are IP-based HTTP Multicast over UDP (HTTPMU) directory, HTTP over UDP (HTTPU) directory, and hyper text transfer protocol (HTTP) stacks, and comprise a protocol stack defined in a UPnP device architecture, a protocol stack defined in a UPnP forum working committee, and a protocol stack defined by a UPnP vendor.

* * * * *